April 16, 1929.  R. M. HILL  1,709,017
AUXILIARY FOCUSING DEVICE AND PROJECTION APPARATUS
Filed Jan. 12, 1927    2 Sheets-Sheet 1
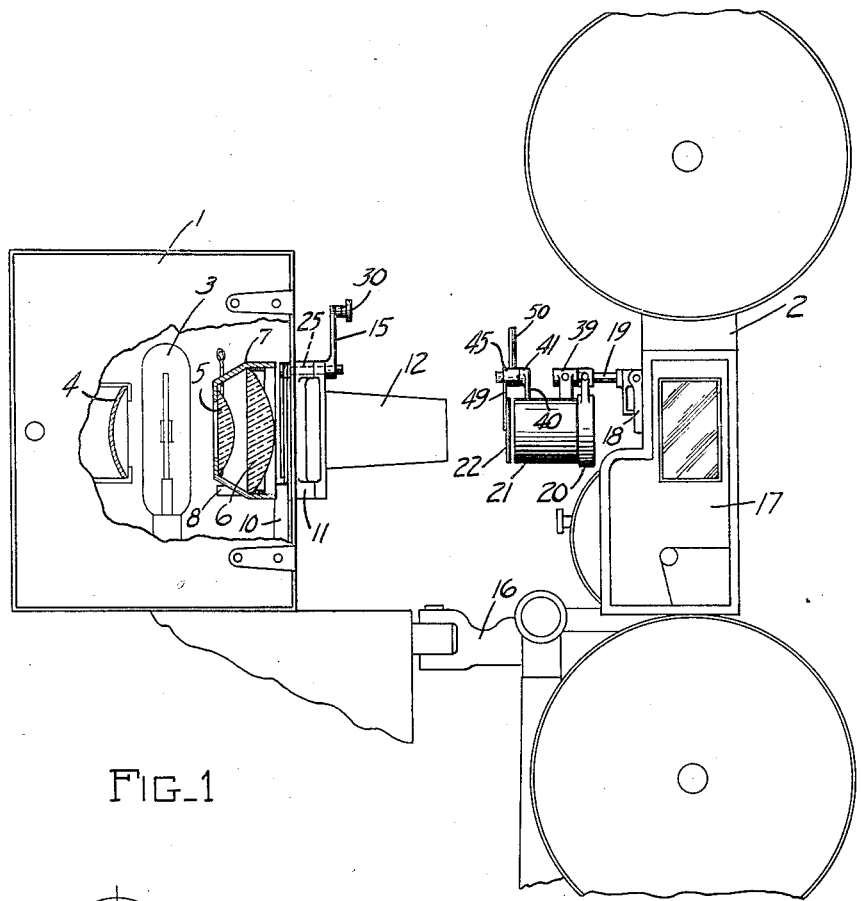
FIG_1
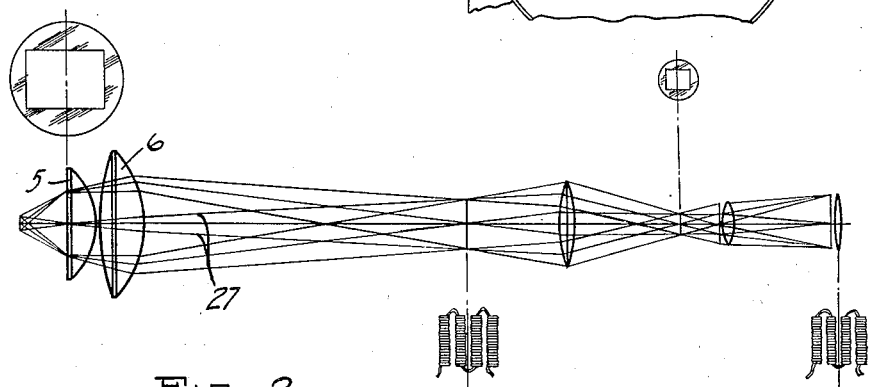
FIG_2
INVENTOR
ROGER M. HILL
BY
ATTORNEYS

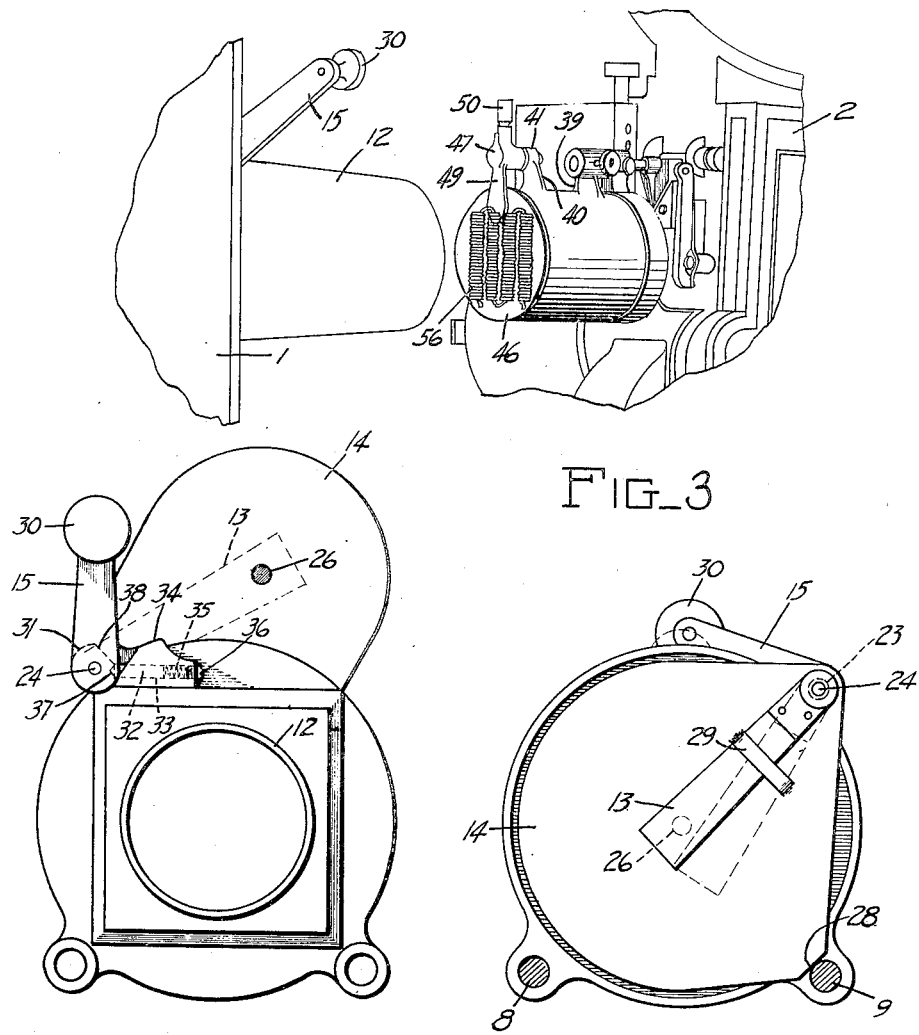
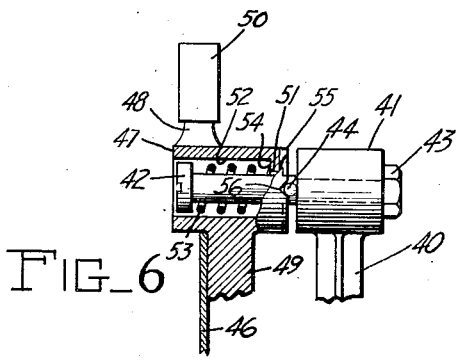

Patented Apr. 16, 1929.

1,709,017

UNITED STATES PATENT OFFICE.

ROGER M. HILL, OF WASHINGTON, DISTRICT OF COLUMBIA.

AUXILIARY FOCUSING DEVICE AND PROJECTION APPARATUS.

Application filed January 12, 1927. Serial No. 160,644.

This invention relates to stereopticons, spotlights and other forms of projection apparatus, more especially it is directed to a means for aiding the operator in determining the quality and intensity of screen illumination previous to projection.

One object of the invention is to provide a method and apparatus for determining and instantly checking the proper axial alignment and relative positioning of the light source and reflector with respect to their optical system to insure the desired focus for projection.

Another object is to confine preliminary focusing within the projection apparatus so that when the screen is illuminated the proper intensity is obtained without further adjustment.

Still another object is to provide a means whereby the operator in a single operation, may completely exclude the light rays from the remainder of the apparatus.

Another object is to provide a means by which the operator, previous to projection, may select a beam of maximum homogeneous intensity.

With these and other objects in view this invention consists in certain novel details of construction, combination and arrangement of parts to be more particularly hereinafter set forth and claimed.

Briefly stated, this invention consists of a means for projecting a small beam of light from the illuminating source upon a shutter which serves as a diminutive auxiliary screen in order that the operator may determine, previous to projection, and correct if necessary, the alignment and focus required of the illuminating and primary condenser systems to produce homogeneousness of screen illumination.

Heretofore in motion picture projection work it has been customary for the operator, who desired to test the intensity and quality of illumination previous to projection, to allow a beam from the illumination source to pass through a pin hole in a card, directing said beam on some part of the apparatus where the illumination could be observed.

This method afforded an inaccurate test due to the absolute lack of means for obtaining a proper focus for the light source. In the pin hole method for obtaining a testing beam an equally distinct image of the illuminant is formed any where along the beam, thus affording no absolute check for the proper relative positionment of illuminant, reflector and condenser lenses, whereas by projecting a ray through a hole having an appreciable diameter, the rays from the extremities of the illuminant, after leaving the primary condenser system, converge and meet at a point which forms a locus for the formation of an image. The plane where this image is formed serves best for the location of a testing screen and it is here that the target is located to serve this purpose. Thus in the present device a shutter containing a hole of properly proportioned diameter is provided to permit the projection of the light source on a target serving as a diminutive screen and placed at a position where the image of the light source will be most distinctly shown.

Another disadvantage in utilizing the pin hole to observe the image of the luminant is that the image, due to its extreme faintness can only be observed in semidarkness.

Referring more particularly to the accompanying drawings in which corresponding parts are indicated by similar reference characters:

Fig. 1 is a side elevation partly in section showing a lamp house and projector in operative position.

Fig. 2 is a diagrammatic view showing the lens systems, the paths of the rays and the location of images.

Fig. 3 is a perspective view showing the auxiliary condenser and target support with image of the filament focused on the target.

Fig. 4 is a front elevation of the shutter, douser, cam stop, crank handle and lamp house shield, showing the shutter and douser in open position.

Fig. 5 is a rear elevation of the shutter, douser and crank handle showing the shutter in closed position and the douser in either open or closed positions, and Fig. 6 is a vertical section of the target bearing.

In describing the details of construction which have been adapted for the purpose of illustration, the assembly of a cinema apparatus utilizing my invention will first be considered.

Referring to Fig. 1, numeral (1) designates the lamp house and (2) the projector. In connection with the lamp house is shown the incandescent lamp (3), reflector (4), condenser lenses (5) and (6), lens casing (7), lens casing supporting rods (8) and (9), supporting frame (10), slide frame (11), light shield (12), douser (13), shutter (14) and control handle (15).

The lamp house (1) is connected to the projector (2) by means of the link (16). In connection with the projector is shown the projector housing (17) and frame door (18). Attached to the frame door (18) and projecting perpendicularly therefrom is the supporting rod (19), constituting a bracket to which is adjustably attached the auxiliary condenser frame (20), auxiliary condenser shield (21) and target (22).

The lamp house shutter, douser and projection target which constitute the patentable features of this invention will now be described. The shutter (14) which is placed directly in front of the condenser lenses (5) and (6) consists in a half circular half rectangular shield, which is drilled centrally and at one corner of its rectangular portion, the latter circularly drilled opening (23) serving as a bearing by which the shutter is rotatably mounted on an axial support consisting of a shaft (24) which in turn is rotatably mounted in a bearing (25) formed in the slide frame (11).

The centrally drilled opening (26) in the shutter (14) is for the projection of a central pencil ray (27) shown diagrammatically in Fig. 2 and which will hereinafter be further described. The undrilled corner of the rectangular portion of the shutter is cut off to form an abutting edge (28) which, when the shutter is lowered, comes into contact with the condenser lens support (9) acting as a stop.

At one extremity of the shaft (24) is rigidly attached a douser (13) consisting of a comparatively narrow metallic strip having slightly diverging opposite edges and which is limited in its relative angular movement with respect to the shutter (14) by a narrow strip (29) formed between two parallel slits cut in the shutter. The strip is raised sufficiently beyond the surface of the shutter to permit the insertion of the douser thereunder, and sufficient clearance is allowed at either end of the raised strip (29) to permit a slight movement of the douser relative to the shutter, as shown by dotted lines in Fig. 5. This slight movement is required to uncover the central opening (26) after the shutter is closed as will hereinafter be described.

At one end of the crank (15) is attached a thumb wheel (30) and at the opposite end is formed a boss which is drilled to fit the shaft (24) to which it is rigidly attached. On the external surface of this boss is cut a cam (31) which reacts against a plunger (32) slidably mounted in the circularly drilled opening (33) in a lug (34) projecting from the upper portion of the slide frame (11). One end of the plunger (32) is rounded, the other flat, the flattened end serving as a bearing surface for contact with a coil spring (35) which is held within the circular opening (33) by means of the machine screw (36).

On the surface of the cam (31) is cut a groove (37) into which the rounded end of the plunger (32) moves when the cam is rotated until the groove (37) registers with the circularly drilled opening (33), thus retaining the douser (13) and shutter (14) in an elevated position as shown in Fig. 4.

The flattened surface (38) of the cam (31) is cut so that the distance from the axis of the shaft to points on its surface increases directly as the distance increases from the groove (37). Thus it will be seen that in lowering the douser the cam reacts against the action of the plunger (32) and since the shutter (14) is rotatably mounted on the shaft (24) it simply follows the douser until it reaches its lowermost position where the shutter is stopped by abutting the condenser lens supporting rod (9). If the cam is then rotated farther the clearance between the width of the douser (13) and the ends of the strip (29) will permit the douser to move onward until the central opening (26) in the shutter (14) is uncovered.

Projecting perpendicularly from either end of the auxiliary condenser shield (21) are brackets (39) and (40) one of which, namely (39), is adjustably mounted on the supporting rod (19). The other bracket (40) terminates in a centrally drilled boss (41) through which a machine screw (42) passes, and is retained therein by means of the nut (43) and the pin (44) which passes through the stem of the screw and abuts against the boss. Upon the stem and head of the screw (42) is rotatably mounted a bearing bracket (45) to which the target (46) is attached.

The bearing bracket (45) consists of a cylindrical body (47) having oppositely projecting members (48) and (49), the upper member (48) serving as a support for an insulated handle (50), the other member (49) is flattened and functions as a support for the target (46).

The cylindrical body (47) is drilled to two diameters, the smaller (51) to slidably fit the stem, and the larger (52) to receive the head of a machine screw (42). The space between the stem of the machine screw (42) and the larger internal diameter (52) of the cylindrical body is fitted with a spring (53) which reacts against the head of the screw (42) and the shoulder (54) to hold the body of the bracket against the pin (44). Notches (55) and (56) cut at right angles to each other at the end of cylindrical body (47) engage the pin (44) to retain the target shutter in either a raised or lowered position.

In the operation of my device both target and douser are set as shown in Figs. 1, 3 and 5, the operator by then exerting further pressure on the crank (15), rotates the douser (13) until the central opening (26) of the shutter is uncovered, thus permitting light rays from the luminant to be projected on the target (46) as shown in Fig. 3 and also diagrammatically as in Fig. 2.

If the relative distances of luminant, reflector and condenser lenses are properly determined the projection on the target will be the image of the luminant as shown in Figs. 2 and 3. The proper relative distances are determined by trial, the desired focus being selected by the clearness of the image formed. After adjustments have been made and the desired focus obtained the path of the rays can be quickly cleared for screen projection by rotating the target, shutter and douser to their upright positions.

Although in the foregoing certain elements have been described as best adapted to perform the functions allotted them, nevertheless it is to be understood that various minor changes may be resorted to within the scope of the appended claims without departing from or sacrificing any of the principles of the invention.

Having described my invention, what I claim as new and wish to secure by Letters Patent is:

1. In a projection apparatus the combination with a radiant, condenser and objective system, optically associated to produce a beam suitable for projection purposes; of a rotatably mounted manually controlled shutter movable into and out of the path of the beam and having a central normally closed opening, means in connection with the shutter to momentarily expose said opening to produce a beam of restricted dimensions and a focusing target located between the condenser and objective system and rotatable into and out of the beam at a point coincident with the locus of the image.

2. In a projection apparatus the combination with a radiant, condenser and objective system, optically associated to produce a beam suitable for projection purposes; of a shutter movable into the path of the beam and having a central opening, a douser normally closing the shutter opening, said douser being operable to expose the opening in the shutter to produce a beam of restricted dimension, and a focusing target located between the condenser and objective system and rotatable into and out of the beam at a point coincident with the locus of the image.

3. In a projection apparatus the combination with a radiant, condenser and objective system, optically associated to produce a beam suitable for projection purposes; of a shutter movable into the path of the beam and having a central opening, a spring pressed douser normally closing the shutter opening, said douser being operable to expose the opening in the shutter to produce a beam of restricted dimension, and a focusing target located between the condenser and objective system and rotatable into and out of the beam at a point coincident with the locus of the image.

4. In a projection apparatus the combination with a radiant, condenser and objective system, optically associated with the radiant to produce a beam suitable for projection purposes; of a shutter operable into and out of the path of the beam and having a central opening therein, a douser normally closing the shutter opening, said douser being rotatably mounted adjacent to and concentric with said shutter and adapted to momentarily expose said opening to produce a beam of restricted dimension, and a focusing target located between the condenser and objective system and rotatable into and out of the beam at a point coincident with the locus of the image.

5. In a projection apparatus the combination with a radiant, condenser and objective system, optically associated with the radiant to produce a beam suitable for projection purposes; of a shutter rotatable into and out of the path of the beam and having a central opening therein, a douser normally closing the shutter opening, said douser being rotatably mounted adjacent to and concentric with said shutter and adapted to momentarily expose said opening to produce a beam of restricted dimensions, and a focusing target located between the condenser and objective system and rotatable into and out of the beam at a point coincident with the locus of the image.

6. In a projection apparatus the combination with a radiant, condenser and objective system, optically associated with the radiant to produce a beam suitable for projection purposes; of a shutter mounted in front of the condenser system, rotatable into and out of the path of the beam and having a central opening therein, a douser normally closing the shutter opening, said douser being rotatably mounted adjacent to and concentric with said shutter and adapted to momentarily expose said opening to produce a beam of restricted dimensions, and a focusing target located between the condenser and objective system and rotatable into and out of the beam at a point coincident with the locus of the image.

7. In a projection apparatus the combination with a radiant, condenser and objective system, optically associated with the radiant to produce a beam suitable for projection purposes; of a shutter adapted to intercept the beam in front of the condenser system and having a central opening therein, a douser normally closing the shutter opening, said douser being rotatably mounted adjacent to and concentric with said shutter and adapted to momentarily expose said opening to produce a beam of restricted dimensions, and a focusing target located between the condenser and objective system and rotatable into and out of the beam at a point coincident with the locus of the image.

8. In a projection apparatus the combination with a radiant, condenser and objective system, optically associated with the radiant to produce a beam suitable for projection purposes; of a shutter operable into and out of the path of the beam and having a central opening therein, a douser normally closing the shutter opening, said douser being operable to expose the said opening to produce a beam of restricted dimensions, and a focusing target rotatable into and out of the path of the restricted beam intermediate the condenser and objective systems and coincident with the locus of the image of the radiant.

9. In a projection apparatus the combination with a radiant, condenser and objective system, optically associated with the radiant to produce a beam suitable for projection purposes, of a shutter operable into and out of the path of the beam and having a central opening therein, a douser normally closing the shutter opening, said douser being operable to expose the said opening to produce a beam of restricted dimension and a focusing target located between the condenser and objective system and rotatable into and out of the beam at a point coincident with the locus of the image.

10. In a projection apparatus the combination with a radiant, condenser and objective system, optically associated with the radiant to produce a beam suitable for projection purposes; of a shutter operable into and out of the path of the beam and having a central opening therein, a douser normally closing the shutter opening, said douser being operable to expose the said opening to produce a beam of restricted dimension and a focusing target movable into and out of the path of the beam at a point between the condenser and objective systems, and coincident with the locus of the radiant image.

11. In a projection apparatus the combination with a radiant, condenser and objective system, optically associated with the radiant to produce a beam suitable for projection purposes; of a shutter operable into and out of the path of the beam and having a central opening therein, a douser normally closing the shutter opening, said douser being operable to expose the said opening to produce a beam of restricted dimension and a focusing target located between the condenser and objective system and rotatable into and out of the beam at a point coincident with the locus of the image.

ROGER M. HILL.